United States Patent [19]
Quint

[11] Patent Number: 5,907,014
[45] Date of Patent: May 25, 1999

[54] CASTABLE LIQUID PREPOLYMERS AND POLYURETHANES

[75] Inventor: Robert John Quint, Watertown, Conn.

[73] Assignee: Uniroyal Chemical Company, Inc., Middlebury, Conn.

[21] Appl. No.: 08/999,607

[22] Filed: Sep. 30, 1997

Related U.S. Application Data

[63] Continuation of application No. 08/518,099, Aug. 25, 1995, abandoned.

[51] Int. Cl.$^6$ .................................................... C08G 18/10
[52] U.S. Cl. .......................... 524/773; 524/871; 528/48; 528/59; 427/389.9; 474/268; 156/331.7; 252/182.22
[58] Field of Search .................................. 524/773, 871; 528/48, 59; 427/389.9; 474/268; 156/331.7; 252/182.22

[56] References Cited

U.S. PATENT DOCUMENTS

| | | | |
|---|---|---|---|
| 3,962,511 | 6/1976 | Foti | 156/331 |
| 4,273,179 | 6/1981 | Gardikes | 164/43 |
| 4,490,518 | 12/1984 | Fuzesi et al. | 527/401 |
| 5,102,919 | 4/1992 | Swab | 521/130 |
| 5,114,985 | 5/1992 | Kuyizin | 521/130 |

OTHER PUBLICATIONS

DBE Purges Polyurethane Equipment Without Methylene Chloride Risks, *Elastomerics*, Oct. 1990, pp. 56–60.

Dibasic Esters (DBE), *Dupont Technical Information* Aug., 1994.

*Primary Examiner*—Rachel Gorr
*Attorney, Agent, or Firm*—Raymond D. Thompson

[57] ABSTRACT

Disclosed is an aromatic diisocyanate prepolymer combined with a dibasic ester, preferably a mixed dialkyl ester of adipic, glutaric and succinic acids, which when used with amine or polyol curatives to make solid, non-foamed elastomeric polyurethane and/or polyurethane/urea products reduces viscosity and improves wettability of the castable polyurethane prepolymer without loss of cured physical properties. This improved wettability of the liquid prepolymer is useful for impregnation of fabrics, preferably polyesters, during the manufacture of a polyurethane coated fabric type belting.

7 Claims, 5 Drawing Sheets

CASTABLE LIQUID PREPOLYMERS AND POLYURETHANES

This is a Continuation of application Ser. No. 08/518,099, filed Aug. 25, 1995, now abandoned.

BACKGROUND OF THE INVENTION

This invention relates to elastomeric polyurethane and/or polyurethane/urea products and more particularly to a unique composition consisting of a prepolymer and a dibasic ester additive which reduces viscosity and improves wettability of the castable polyurethane prepolymer. This invention relates further to an effective process for improving wettability of the liquid prepolymer to polyester fabric during the manufacture of a polyurethane coated fabric type of belting.

The additive of this invention imparts the improvements above without reduction in hardness and eliminates the deleterious effects that occur with other additives classed as plasticizer or diluents. At the preferred ratios of the dibasic acid ester with the aromatic diisocyanate prepolymer, this invention has in fact been found to increase certain properties, modulus, tensile strength, or tear strength. The claimed composition does not reduce other important cured properties at levels of addition that other plasticizer additives do exhibit degraded physical properties.

Aromatic polyisocyanates are well known and are widely used in the preparation of polyurethane and poly urethane/urea elastomers. These aromatic diisocyanates generally include compositions such as 2,4-toluene diisocyanate, 2,6-toluene diisocyanate, 4,4'-methylene bis (phenylisocyanate) and the like. In the preparation of polyurethane and polyurethane/urea elastomers, the aromatic diisocyanates are reacted with a long chain (high molecular weight) polyol to produce a prepolymer containing free isocyanate groups which then may be chain extended with a short chain (low molecular weight) polyol or aromatic diamine to form a polyurethane or polyurethane/urea elastomer. Long chain, high molecular weight polyols, e.g. those having a molecular weight of above 250, are generally utilized to form the prepolymer and the chain extender is generally a short chain polyol, e.g., $C_2$–$C_{10}$ polyol, or an aromatic diamine. The long chain, high molecular weight polyol provides flexibility and elastomeric properties to the resin, while the short chain polyol or aromatic diamine provides chain extension or cross-links and adds toughness and rigidity to the resulting elastomeric polymer.

It is known that certain additives termed plasticizer or diluents when added to polyurethane prepolymers will reduce the viscosity of these prepolymers. A simultaneous effect also with these additives is to significantly reduce certain cured properties of the polyurethane elastomer such as hardness, modulus and tensile strength. Surprisingly, it has been found that by incorporating DBE (dibasic ester) in the prepolymer, the desired properties of improved fabric wetting time, and reduced viscosity are achieved without reducing the hardness, modulus, tensile strength and tear of the cured elastomer. In certain ratios of DBE to prepolymer, critical properties of modulus, tensile strength and tear strength are actually found to improve over the same prepolymer without DBE. This improvement in properties is very surprising and has heretofore not been possible when known plasticizers are added to urethane prepolymers.

SUMMARY OF THE INVENTION

This invention is directed to an organic diisocyanate prepolymer comprising a reaction product formed by reacting an organic diisocyanate and one or more polyols selected from the group consisting of polyether polyols, polyester polyols, polybutadiene diol, and castor oil; at a temperature and for a time sufficient to form said reaction product; and about 1 to about 25 weight percent, preferably about 1 to about 10 weight percent, of a dibasic ester being blended with said reaction product, said dibasic ester being selected from the group consisting of aliphatic esters of oxalic, malonic, adipic, glutaric, succinc, maleic, or fumaric acid; esters of acids that contain an aliphatic ring; and esters that are reaction products of an epoxy alcohol or an epoxy acid with each other or with an aliphatic acid; and aromatic diesters such as diesters of isophthalic or terephthalic acids or combinations thereof. Also contemplated is a process of making a solid, nonfoamed, non porous polyurethane elastomer from an organic diisocyanate prepolymer comprising adding to said organic diisocyanate prepolymer about 1 to about 10 weight percent of a dibasic ester to form a blended prepolymer; reacting and curing said blended prepolymer with a curingly effective amount of an aromatic diamine or polyol curative for a time and at a temperature sufficient to form a polyurethane elastomer. The instant prepolymers and urethanes can effectively be utilized in a method for protectively coating a fabric. Such fabric being useful in fabric reinforced conveyor belting with polyurethane coating surfaces and binder layers between fabric plies. This composition provides protection to the belt material including the durable physical properties characteristic of polyurethane coatings.

The composition comprises a plasticizing material, dibasic ester, which not only allows the coating process to be feasible and easily accomplished, but also enhances the physical properties of the cured product. This is a totally unexpected result which will be further described and illustrated herein.

DETAILED DESCRIPTION OF THE INVENTION

In the practice of this invention, a polyurethane prepolymer with improved wetting is made by the addition of certain dibasic ester compounds during or after the synthesis of a polyurethane prepolymer. The prepolymer is made by the reaction of an organic diisocyanate such as methylene bis(phenylisocyanate) (MDI) or toluene diisocyanate (TDI) with high molecular weight polyols. The prepolymer can be further reacted with conventional organic diamines or polyol curatives to form elastomeric polyurethane.

The dibasic ester may be added to a reactive mixture of organic diisocyanate and high molecular weight aliphatic polyester or polyether polyols to produce a prepolymer. The dibasic acid ester may also be added to the finished prepolymer.

Optionally, a mixture of polyols may be utilized. Low molecular weight polyol (mw<250) and a high molecular weight polyol (mw>250) may also be reacted with a diisocyanate and the dimer of TDI.

Synthesis of the prepolymer is known to those skilled in the art. Representative of the diisocyanates include 4,4'-methylene bis (phenylisocyanate)[MDI] and the two main isomers of toluene diisocyanate, that is, the 2,4- and the 2,6-diisocyanate and optionally, a small amount of the ortho isomers, the 2,3- and 3,4-isomers. Commercially, toluene-diisocyanate is found as a 65:35, 80:20 or 99:1 isomer mix of the 2,4- and 2,6-isomer by weight and optionally from 0–5% by weight of the ortho isomers. An isomer mix is preferred within a range, e.g., from 65–100% of the 2,4-isomer and the balance, i.e., 0–35% being essentially the 2,6-isomer. The most preferred range of the 2,6-isomer is 0–5%. Other useful organic diisocyanates are those known conventionally such as H12MDI, a mixture of the three geometric isomers of 1,1'-methylene-bis-(4-isocyanatocyclohexane); isophorone diisocyanate (IPDI); and 1,4-cyclohexane diisocyanate (CHDI) and mixtures thereof, paraphenylene diisocyanate (PPDI) and the like.

High Mw polyols, namely polyether polyols or polyester polyols having a number average molecular weight of at least 250, are used to prepare the prepolymer of the instant invention. Molecular weight of about 650 to 3000 is preferred, with molecular weight of 1000 being the most preferred. However, the molecular weight of the high Mw polyol may be as high as 10,000 or as low as 250. The preferred polyalkyleneether polyols may be represented by the general formula $HO(RO)_n H$, wherein R is an alkylene radical and n is an integer large enough that the polyether polyol has a number average molecular weight of at least 250. These polyalkyleneether polyols are well-known components of polyurethane products and can be prepared by the polymerization of cyclic ethers such as alkylene oxides and glycols, dihydroxyethers, and the like by known methods.

The polyester polyols are prepared by reaction of dibasic acids (usually adipic acid but other components such as sebacic or phthalic acid may be present) with diols such as ethylene glycol, 1,2-propylene glycol, 1,4-butylene glycol and diethylene glycol, etc., where linear polymer segments are required, or include units of higher functionality such as glycerol, trimethylol propane, pentaerythritol, sorbitol, etc., if chain branching or ultimate cross-linking is sought. Some polyester polyols also employ caprolactone and dimerized unsaturated fatty acids in their manufacture. Another type of polyester which is of interest is that obtained by the addition polymerization of e-caprolactone in the presence of an initiator. Other polyols that can be used are those that have at least two hydroxyl groups and whose basic backbone is obtained by polymerization or copolymerization of such monomers as butadiene and isoprene monomers. Trifunctional polyols, polybutadiene diol and castor oil are representative of practical alternative polyols as defined herein.

The total polyol blend portion of the instant invention can be combination of high Mw polyol, as previously described, and a low molecular weight polyol. An aliphatic glycol is the preferred low molecular weight polyol or a trifunctional polyol like trimethylol propane (TMP). Suitable aliphatic polyols are ethylene glycol, diethylene glycol, dipropylene glycol, neopentyl glycol, 1,3-butanediol, 1,4-butanediol, cyclohexyldimethanol (CHDM) and the like. The most preferred low molecular weight polyol is 1,4-butanediol. In general, the weight of the low molecular weight polyol should be no more than 20% of the combination of high molecular weight polyol and low molecular weight polyol. The preferred range is 0 to 15% of the combination; more preferred is 0–8%.

The dibasic ester used in the present invention may be a blend of several organic dicarboxylic acid esters. Typical of this type of ester would be aliphatic esters of such dicarboxylic acids as oxalic, malonic, adipic, glutaric, succinic, maleic, or fumaric. Also included in this group are the esters of acids that contain an aliphatic ring structure such as cyclohexane propionic acid or esters that are reaction products of an epoxy alcohol or an epoxy acid with each other or with any of the species listed above. Additionally, the ester may be derived from the aromatic diacids such as diesters of isophthalic, or terephthalic acids. Any of the above species may be present alone or in combinations of at least two. Preferred are the aliphatic dialkyl esters where the alkyl group is $C_1$ to $C_7$, more preferred $C_1$ to $C_4$, most preferred $C_1$ to $C_2$.

A commercially available mixture of this type of material is known as Dibasic Ester (or DBE) as is available from the DuPont Company. This material, refined dimethyl esters of adipic, glutaric and succinic acids, is preferred in the practice of use in the instant invention. There are a variety of refined products available where the amount of each of the three dimethyl ester components ranges from 0 to 99 weight percent. A Most preferred blend is comprised of about 15–25% dimethyl succinate, about 55–65% dimethylglutarate, and about 10–25% dimethyl adipate, with nominal values being, about 23% dimethyl succinate, about 56% dimethylglutarate, and about 21% dimethyl adipate. This material is heretofore known as suitable for a wide range of industrial uses relating to use as a solvent, plasticizer, polymer intermediate. The primary use has been as a solvent that may be used instead of glycol ethers, glycol ether acetates, or high-boiling ketones and aromatic solvents in paint or coatings formulations.

Examples of this type of use include formulations of acrylic lacquer and enamel automotive coating topcoat, epoxy primers, polyurethane auto accessory finishes, polyester coil coating, vinyl coil coating, automotive refinish applications, high-gloss baked enamels, and can coatings. Developmental applications include high solids urethane solvent, high solids polyester solvent, wire coating, magnetic memory disks, cleaning formulations, insecticide carriers, adhesive solvents, sealant solvents, wax formulations, non-aqueous dispersion (NAD) primers, and printing inks. These uses are unrelated to those of the instant invention.

The dibasic acid ester may be added to improve wettability and viscosity reduction to the prepolymer either to the finished prepolymer or during its manufacture at levels up to 25% of the total weight of the prepolymer constituents. A preferred range, known to have improved physical properties in addition to improving wettability and viscosity reduction, is from about 1 to about 10% and most preferred from about 3 to about 7%.

The prepolymers are prepared in a conventional manner, for example, by charging the diisocyanate, such as MDI or TDI to a reactor then adding the polyol or polyol blend, maintaining the temperature from room temperature to temperatures as high as 150° C. for times necessary to react all the available hydroxyl groups. Preferred reaction temperatures are 50° C. to 120° C.; more preferred are 50° C. to 110° C.

At this time, DBE may be added with continued stirring for a time sufficient to mix thoroughly. The product is then poured into containers under a nitrogen flush and stored at room temperature. Alternatively, the dibasic ester may be added to the package containing the finished prepolymer.

The curative used for the prepolymer can be selected from a wide variety of conventional and well known organic diamine or polyol materials. Preferred materials for TDI based prepolymers are the aromatic diamines which are either low melting solids or liquids. Preferred materials for MDI-based prepolymers are the short chain polyols. Specifically preferred are the diamines or polyols having a melting point below 120° C. If melting point is above 120° C., then plasticizer may be used to lower the effective meeting point of the curative. These diamines or polyols are generally the present ones used in the industry as curative for polyurethane. The selection of a curative is generally based on reactivity needs, or property needs for a specific application, process condition needs, and pot life desired. Of course, known catalysts may be used in conjunction with the curative.

Representative of the most preferred materials for MDI-based prepolymers are: polyols including higher molecular weight polyols (ie 1000 to 2000 Mol.Wt.) and lower molecular weight polyols such as aliphatic glycols or a trifunctional polyol like trimethylol propane (TMP). Suitable aliphatic polyols are ethylene glycol, diethylene glycol, dipropylene glycol, neopentyl glycol, 1,3-butanediol, 1,4-butanediol, cyclohexyldimethanol (CHDM) and the like. The most preferred low molecular weight polyol is 1,4-butanediol.

Representative of the most preferred materials for TDI-based prepolymers are: 4,4'-methylene-bis(3-chloro)aniline (MBCA), 4,4'-methylene-bis(3-chloro-2,6-diethyl)aniline (MCDEA), diethyl toluene diamine (DETDA), tertiary butyl toluene diamine (TBTDA), dimethylthio-toluene diamine (Ethacure™ 300) from Ethyl Corporation, trimethylene glycol di-p-amino- benzoate, and 1,2-bis(2-aminophenylthio) ethane.

In the case of MDI-based prepolymers, the stoichiometric ratio of isocyanato groups to hydroxyl groups in the reactants should preferably be from 2/1 to 7/1 although somewhat lower and higher ratios are permissible. When the ratio is much lower, the molecular weight of the isocyanato terminated polyurethane becomes so large that the viscosity of the mass makes mixing of chain extenders into the prepolymer relatively more difficult. At the other extreme, a ratio of 2 isocyanato groups to one hydroxyl group is the theoretical ratio for the end-capping of a polyalkyleneether or ester polyol with a diisocyanate. An excess approaching the 5/1 ratio will result in high levels of free diisocyanate in the mixture. Therefore, the preferred range is 2/1 to 5/1.

In the case of TDI-based prepolymers, the stoichiometric ratio of isocyanato groups to hydroxyl groups in the reactants should preferably be from 1.5/1 to 2.5/1 although somewhat lower and higher ratios are permissible. When the ratio is much lower, the molecular weight of the isocyanato terminated polyurethane becomes so large that the viscosity of the mass makes mixing of chain extenders into the prepolymer relatively more difficult. At the other extreme, a ratio of 2 isocyanato groups to one hydroxyl group is the theoretical ratio for the end-capping of a polyalkyleneether or ester polyol with a diisocyanate. An excess above the 2/1 ratio will result in high levels of free diisocyanate in the mixture. Therefore, the preferred range is 1.6/1 to 2.1/1. If higher levels of TDI are used, the excess may be removed after the prepolymer reaction by wed known techniques as taught in G.B. 1 101 410.

For curing these prepolymers, the number of —NH$_2$ groups in the aromatic diamine component or OH— in the polyols should be approximately equal to the number of —NCO groups in the prepolymer. A small variation is permissible but in general from about 80 to 110% of the stoichiometric equivalent should be used, preferably about 85 to 100%.

The reactivity of isocyanato groups with amino groups varies according to the structure to which the groups are attached. Some amines react very rapidly with some isocyanates while others react more slowly. In the latter case, it is optional to use catalysts to cause the reaction to proceed fast enough to make the product non-sticky within 30–180 seconds. For some of the aromatic diamines, the temperature of the reaction or of the polyurethane reactant will need only be controlled in order to obtain the proper reaction time; thus, for a diamine that ordinarily would be too reactive, a catalyst would obviously be unnecessary, a lowering of the reaction temperature would suffice. A great variety of catalysts is available commercially for accelerating the reaction of the isocyanato groups with compounds containing active hydrogen atoms (as determined by the well-known Zerewitinoff test). It is well within the skill of the technician in this field to pick and choose catalysts to fit his particular needs or desires and adjust the amounts used to further refine his conditions. Adipic acid and triethylene diamine (available under the trademark Dabco™) are typical of suitable catalysts for TDI-based prepolymer systems. For MDI-based systems, triethylene diamine and tin compounds such as stannous octoate are preferred.

In order to demonstrate the improved rate of wettability of the belting fabric, a method for measurement of this property was devised. The following method was developed for the purpose of predicting the rate of fabric penetration of a polyurethane prepolymer/curative mixture as it is applied to the fabric.

A fabric disc of constant dimension is placed on the surface of the prepolymer at a set temperature. The time for the prepolymer to completely wet the fabric is measured by timing with a stopwatch. The details of the procedure is as follows:

1. At least 200 grams of prepolymer in a pint can is heated to 212° F. Three drops of red reactant dye is stirred into the prepolymer with a glass rod.

2. A 2.13-inch disc is cut out of a sheet of the fabric.

3. The disc is placed flat on the surface of the prepolymer as a stopwatch is simultaneously started.

4. The pint can of prepolymer and fabric disc are put into a 212° F. oven to maintain the temperature and is observed to determine the time necessary for the fabric to be completely wetted by the prepolymer. This time required for complete wetting of the fabric is measured and occurs when the fabric strands achieve the red color of the dyed prepolymer. For this invention, the data is listed in Table 1 as "Wettability" and is reported in minutes.

Also in Table 1 is a column labeled "Viscosity". Viscosity measurements were made on a Brookfield Viscometer using a number 4 spindle at 20 speed. To test viscosity, prepolymer and curative were mixed in a Mark 10 mixing machine and dispensed onto the fabric. The last column in Table 1 depicts the final Shore A hardness after 3 days. It should be noted that the prepolymer used in this Table is the product of Example 1. The additive used is Dibasic Ester as was added in 3, 5 and 7 weight percent.

The following examples are illustrative of the present invention and are therefore not intended as a limitation on the scope thereof.

EXAMPLES

Example 1: Preparation of a Prepolymer

A prepolymer, which is typical of the type of material that may be used in the practice of this invention, is prepared under nitrogen in a reactor by adding 450 parts of 4,4'-methylene bis (phenylisocyanate) and raising the temperature to 50–55° C. Then 1000 parts of polyethylene adipate glycol of 2000 molecular weight and 3.22 parts of trimethanol propane (TMP) are added slowly to keep temperatures below 110° C. The reaction is continued for 4 hours at about 110° C. The product was degassed under vacuum and poured into containers under nitrogen flush and stored at room temperature overnight. After 16 hrs. the percent isocyanate was determined.

Example 2. Preparation of a Prepolymer Containing DBE

A prepolymer was prepared by use of a method analogous to that in Example 1 except that various amounts of dibasic ester (Dupont DBE®) were added to the reaction mixture after the polyol addition and 4 hours reaction time were completed. After addition of the DBE, stirring was continued for one half hour and vacuum was applied for degassing. The product was packaged in the usual manner.

Example 3–5 and Comparative Example A

Curing and Comparison of Physical Properties of Prepolymers Modified with DBE

A series of prepolymers containing various levels of DBE, prepared as described in Example 2, were tested for viscosity, wetting time and Hardness (from cured formulation). These data are shown in Table 1. The same samples were cured with 1,4-butanediol catalyzed with stannous octoate and the physical properties determined. Final Shore A Hardness is included in this Table to demonstrate the lack of significant plasticization up to 7 parts DBE (Example 5).

Physical properties of the cured elastomers containing various levels of DBE (Examples 3–5) and no DBE (Comparative Example A) are given in Table 2. Among the properties given are Modulus at 100–500%, Tensile Strength, Percent Elongation, Bayshore Rebound, Compression Set B, Tear C, and Split Tear Properties.

The expected effects of a typical plasticizer or diluent would be decreased in tensile strength and hardness in a typical ester based polyurethane elastomer. The data presented here shows, unexpectedly, that rather than decreasing with addition of DBE, the physical properties of tensile strength and modulus actually increased. Hardness did not change significantly for the prepolymer modified with up to 7% DBE.

Figure 1:
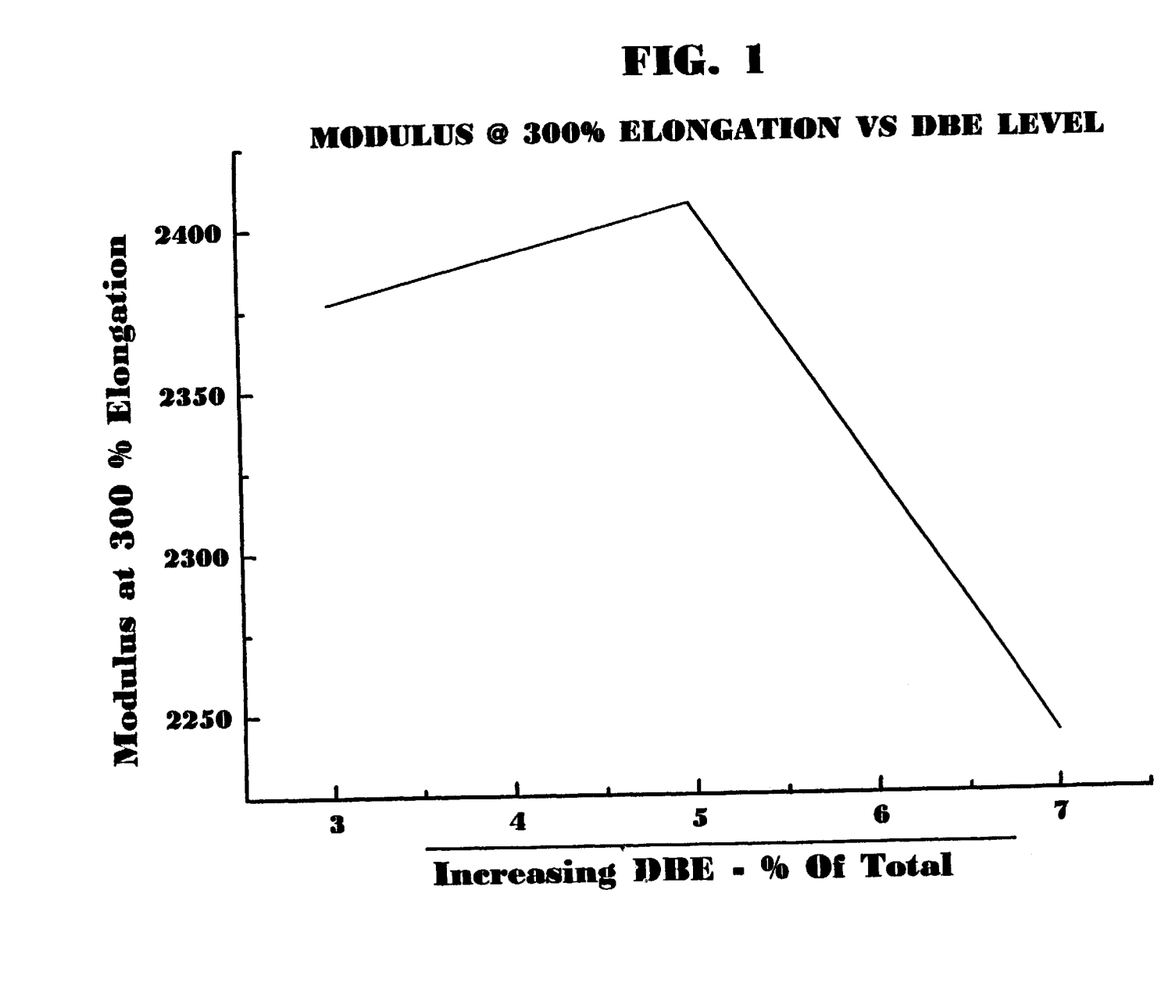
FIG. 1 graphically shows Modulus versus dibasic ester levels.
Figure 2:
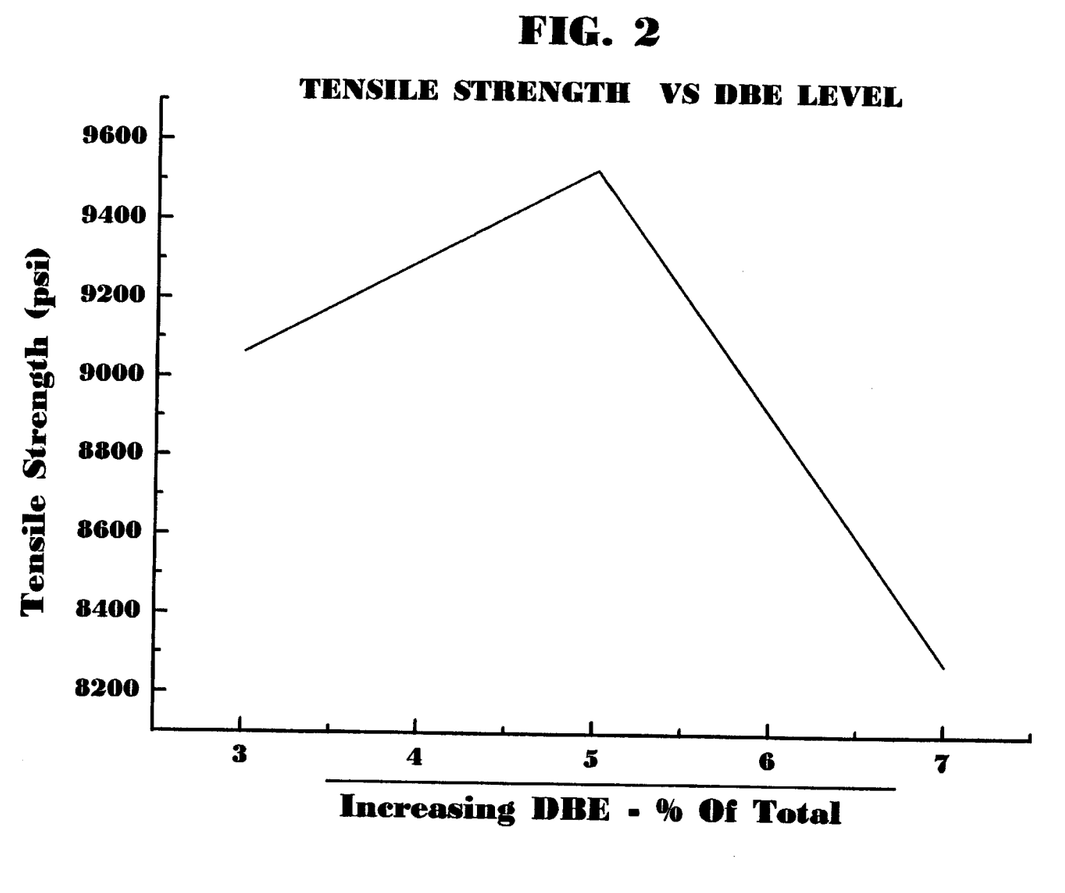
FIG. 2 graphically shows Tensile Strength versus dibasic ester levels.
Figure 3:
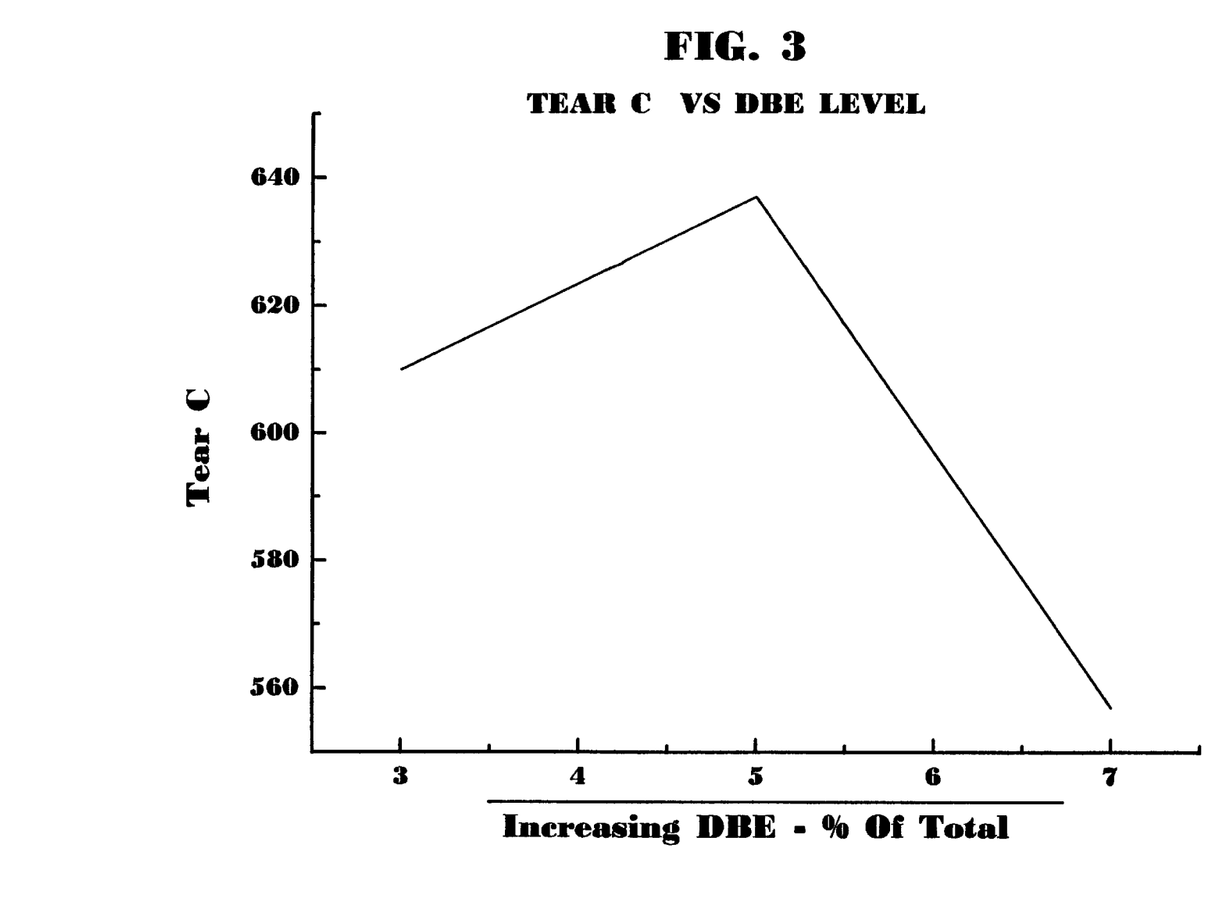
FIG. 3 graphically shows Tear Strength versus dibasic ester levels.
Figure 4:
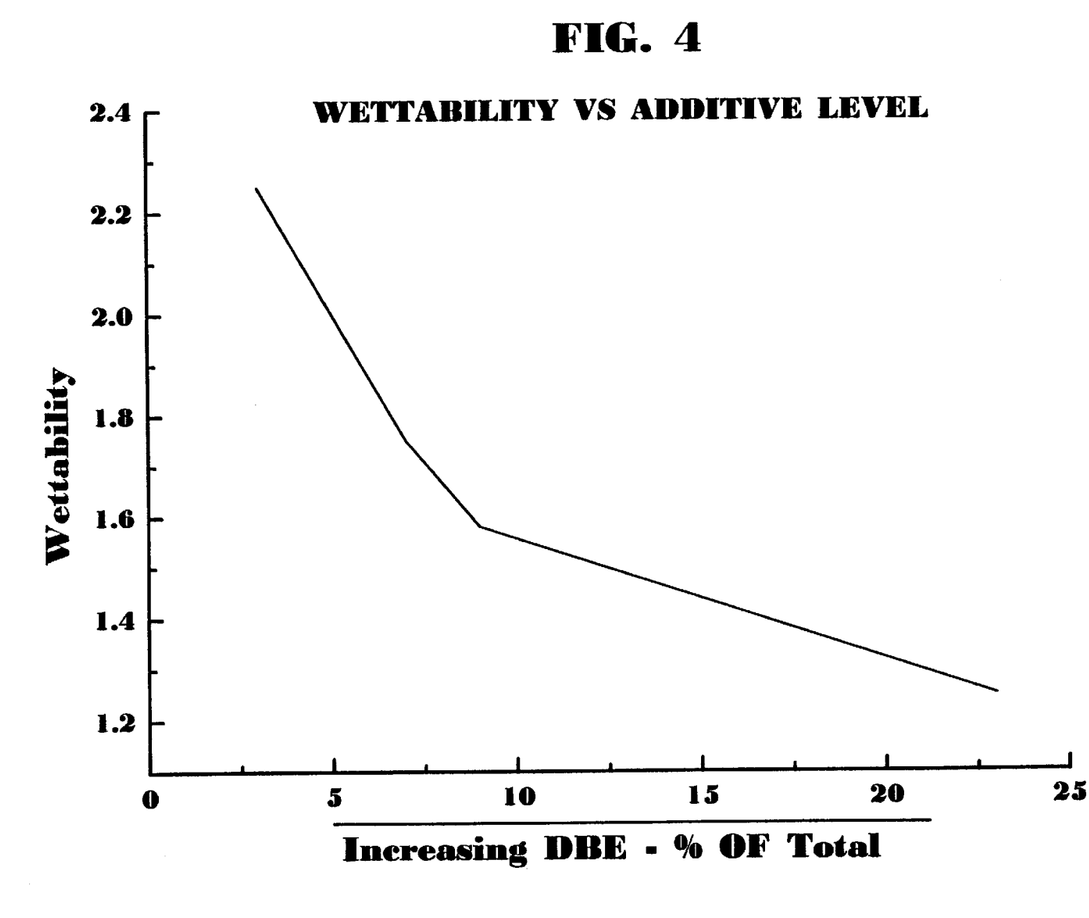
FIG. 4 graphically shows Wettability versus dibasic ester levels.
Figure 5:
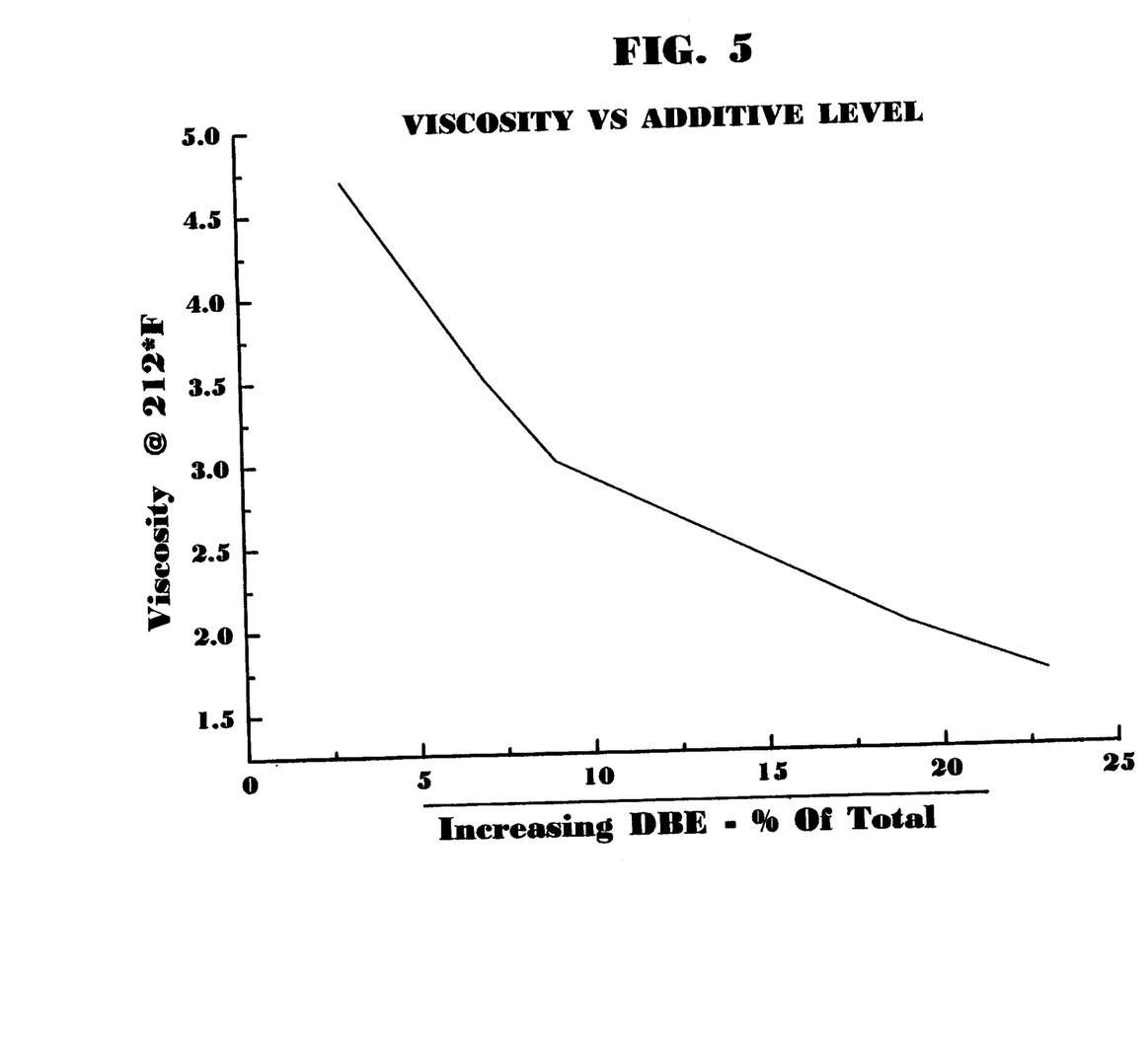
FIG. 5 graphically shows Viscosity versus dibasic ester levels.

FIGS. 1, 2 and 3 all utilize the data from Table 2 demonstrating the surprising and unexpected improvement in physical properties resulting from the incorporation of the dibasic ester in the beneficial range, 1 to 10 percent, and more preferably 3 to 7 percent. FIG. 1 graphically shows Modulus versus dibasic ester levels showing the optimum level of modulus at about 5 percent. Similarly FIG. 2 graphically shows Tensile Strength and FIG. 3 shows Tear Strength showing an optimal value around 5 percent DBE. FIGS. 4 and 5 graphically show Wettability and viscosity versus dibasic ester levels over the range of 3 to 23 percent of added DBE. The values for 3 to 7 percent are taken from Table 1 results. The graphs show that there is a significant inflection point at about 8 percent DBE where the rate of improvement in the two properties begins to decline, however wettability and viscosity levels continue to show the advantage of this invention.

TABLE 1

Optimization of Additive Level in Typical Polyurethane Prepolymer

| Example | % Additive | Viscosity (poise, 100° C.) | Wettability | Final Hardness (3 days; Shore A) |
|---|---|---|---|---|
| A | 0 | 6.0 | 3.00 | 86 |
| 3 | 3 | 4.7 | 2.25 | 86 |
| 4 | 5 | 3.9 | 2.08 | 86 |
| 5 | 7 | 3.5 | 1.75 | 85 |

TABLE 2

Physical Properties of Modified Polyurethane Prepolymer

| Example (% DBE) | 3 (3%) | 4 (5%) | 5 (7%) | A (0%) |
|---|---|---|---|---|
| Shore A Hardness | 86 | 86 | 85 | 86 |
| Modulus @100% E | 1223 | 1133 | 1167 | 1007 |
| Modulus @200% E | 1657 | 1527 | 1550 | 1476 |
| Modulus @300% E | 2377 | 2407 | 2243 | 2224 |
| Modulus @400% E | 3673 | 3857 | 3503 | 3424 |
| Modulus @500% E | 6180 | 6817 | 6037 | — |
| Tensile Strength | 9063 | 9527 | 8280 | 6515 |
| Percent Elongation | 540 | 543 | 540 | 578 |
| Bashore Rebound | 35 | 35 | 42 | 34 |
| Compression Set B | 54 | 46 | 39 | 40 |
| Tear C | 610 | 637 | 557 | 582 |
| Split Tear | 167 | 163 | 160 | 147 |

COMMERCIAL APPLICABILITY

It is known that conveyor belting is an important part of light industry equipment. A conveyor belt is comprised of an endless fabric or elastomer covered belt that traverses between two or more pulleys, and is supported at intermediate points by idler rolls. Carcasses of the conveyor belts are made of one or more plies of a woven fabric bonded together with an elastomeric compound. Woven materials that may be used include cotton, rayon, nylon, polyester, aramids, glass, and blends thereof. The fabrics are constructed with warp yarns that run lengthwise along the belt and filling yarns that run crosswise. Due to the large loads and stresses that these fabrics endure in this application, there is a need to protect the fabric.

Polyurethanes are often a desirable material with which to coat the belting fabric. The polyurethane material can provide excellent resistance to abrasion, cutting, oil and solvents that may be encountered. There have, however, been difficulties in the past when trying to coat conveyor belt materials with protective coatings such as polyurethanes. In the process required to coat fabric with polyurethane for conveyor belting, it has been often the case that the penetration rate of the prepolymer has been too slow. Additives that may lower the viscosity of the prepolymer negatively affected the physical properties of the polyurethane-coated fabric belt.

It is known that certain additives, known as plasticizers or diluents, when added to polyurethane prepolymers will reduce the viscosity of these prepolymers. Unfortunately, a simultaneous effect of these additives is to significantly reduce certain cured properties of the polyurethane elastomer such as hardness, modulus tensile and tear strength.

As shown in the above test data, this invention's polyurethane prepolymers provide improved wettability without sacrificing physical properties. The prepolymers with DBE and diamine or polyol curatives are applied to one or more fabric plies and are subsequently cured at the appropriate temperature and time to create a finished product, i.e. conveyor belt.

Other embodiments of this invention can be contemplated incorporating the essential features of this invention. Such additional embodiments shall be considered part of this invention by reference to the appended claims.

I claim:

1. An organic diisocyanate prepolymer comprising:
   (a) a reaction product formed by reacting toluene diisocyanate or 4,4'-methylene bis (phenylisocyanate and at least one high molecular weight polyether or polyester polyol of between about 250 and about 10000 weight average molecular weight; at a temperature and for a time sufficient to form said reaction product; and
   (b) about 3 to about 7 weight percent of a dibasic ester blended with said reaction product, said dibasic ester being selected from the group consisting of aliphatic esters of oxalic, malonic, adipic, glutaric, succinic, maleic, or fumaric acid or combinations thereof.

2. The organic diisocyanate prepolymer of claim 1 wherein the dibasic ester comprises a mixture of dimethyl succinate, dimethylglutarate, and dimethyl adipate.

3. The organic diisocyanate prepolymer of claim 1 wherein the dibasic ester comprises a weight percentage mixture of about 15–25% dimethyl succinate, about 55–65% dimethylglutarate, and about 10–25% dimethyl adipate.

4. The organic diisocyanate prepolymer of claim 1 wherein the amount of dibasic ester present is from about 3 weight percent to about 5 weight percent.

5. A process of making a solid, castable polyurethane elastomer from an organic diisocyanate prepolymer comprising:
   (a) adding to an organic diisocyanate prepolymer about 3 to about 7 weight percent of a dibasic ester selected from the group consisting of aliphatic esters of oxalic, malonic, adipic, glutaric, succinic, maleic, or fumaric acid, to form a blended prepolymer, said organic diisocyanate prepolymer being a reaction product formed by reacting toluene diisocyanate or 4,4'-methylene bis (phenylisocyanate and at lest one high molecular weight polyether or polyester polyol of between about 250 and about 10000weight average molecular weight; and
   (b) reacting and curing said blended prepolymer with a curingly effective amount of an aromatic diamine or polyol curative for a time and at a temperature sufficient to form a solid, non-foamed polyurethane elastomer.

6. A process for impregnating a fabric comprising the steps of:
   (a) applying the prepolymer of claim 1 blended with an amine or polyol curative to a fabric in an amount sufficient to form a coated fabric; and
   (b) curing said coated fabric with sufficient heat to cure said prepolymer and said curative into a solid, non-foamed elastomeric polyurethane coated fabric.

7. A process according to claim 6 further comprising the steps of: plying up one or more layers of said elastomeric polyurethane coated fabric into a belt carcass prior to said curing step (b).

* * * * *